United States Patent
Choi

(10) Patent No.: US 8,687,721 B2
(45) Date of Patent: Apr. 1, 2014

(54) METHOD FOR SELECTING USER

(75) Inventor: Sang Ho Choi, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/474,510

(22) Filed: May 17, 2012

(65) Prior Publication Data

US 2012/0294380 A1   Nov. 22, 2012

(30) Foreign Application Priority Data

May 20, 2011   (KR) .................. 10-2011-0047906

(51) Int. Cl.
*H04K 1/10* (2006.01)

(52) U.S. Cl.
USPC ........... 375/260; 375/267; 375/299; 375/347; 455/101; 455/103; 455/105; 455/500

(58) Field of Classification Search
USPC .......... 375/260, 267, 299, 347; 455/101, 103, 455/105, 500
See application file for complete search history.

(56) References Cited

FOREIGN PATENT DOCUMENTS

| JP | 2009278238 | * 11/2009 |
|----|------------|-----------|
| KR | 10-2007-0120994 A | 12/2007 |

OTHER PUBLICATIONS

Min et al. an improved user selection algorithm in Multiuser MIMO broadcast'; 2009;IEEE;pp. 192-196.*

* cited by examiner

*Primary Examiner* — Daniel Washburn
*Assistant Examiner* — Rahel Guarino
(74) *Attorney, Agent, or Firm* — Bracewell & Giuliani LLP

(57) ABSTRACT

Disclosed herein is a method for selecting a user. A method for selecting a user in a communication system including a base station having M antennas and K users having one receive antenna includes: (a) calculating channel orthogonality between each of the possible users and previously selected users; and (b) selecting users having the largest channel orthogonality calculated at the step (a) among the possible users.

11 Claims, 2 Drawing Sheets

METHOD FOR SELECTING USER

CROSS REFERENCE(S) TO RELATED APPLICATIONS

This application claims the benefit under 35 U.S.C. Section 119 of Korean Patent Application Serial No. 10-2011-0047906, entitled "Method for Selecting User" filed on May 20, 2011, which is hereby incorporated by reference in its entirety into this application.

BACKGROUND OF THE INVENTION

1. Technical Field

The present invention relates to a method for selecting a user, and more particularly, to a method for selecting a user for maximizing multiuser diversity in performing multiple input multiple output communication under multiuser environment.

2. Description of the Related Art

A multiuser multiple-input multiple-output system, which is an essential element technology for supporting services transmitting data at a rate of 1 Gbp or more in a frequency band of 5 Ghz, may transmit data to users corresponding to the number of maximum transmit antennas at one time by various methods of allowing a single access point (AP) to transmit a signal to multiuser.

When a larger number of users than the number of antennas disposed in the multiuser multiple input multiple output system are present, optimal combinations of users are selected by searching all the combinations of users having a highest multiuser diversity and the multiuser diversity may be maximized by primarily transmitting data to the selected users. Therefore, in the multiple input multiple output communication system in which the multiple users are present, multiuser diversity of the system may be changed according to how to select users intending to transmit data.

However, the methods for selecting users according to the related art have the increased complexity due to the sudden increase in combinations to be searched when there are many users.

SUMMARY OF THE INVENTION

An object of the present invention is to provide a method for selecting a user capable of maximizing multiple diversity of a multiuser multiple input multiple output system.

According to an exemplary embodiment of the present invention, there is provided a method for selecting a user in a communication system including a base station having M antennas and K users having one receive antenna, including: (a) calculating channel orthogonality between each of the possible users and previously selected users; and (b) selecting users having the largest channel orthogonality calculated at the step (a) among the possible users.

At the step (a), the channel orthogonality may be calculated using Equation $$\beta_k = \frac{\prod_{i=1}^{k} \|h_i\|^2}{\det[HH^*]}, H = [h_1^T | \ldots | h_{k-1}^T]^T,$$

where i represents an order of algorithm performance, h is a channel vector of one user selected among the possible users, and H represents a channel matrix formed of channels of previously selected k−1 users.

The step (b) may be performed using Equation $$\pi(i) = \operatorname*{argmin}_{k \in U_i} \|\beta_k\|$$

$$S_c \leftarrow S_c \cup \{\pi(i)\},$$

where S represents selected user groups and π(i) represents a user number selected as i-th.

The method for selecting a user may further include: after the step (b), (c) excluding the selected users from a set of the possible users.

The method for selecting a user may further include: after the step (c), (d) excluding users having the channel orthogonality with the user selected at the step (b) smaller than a predefined threshold among the possible users.

The step (d) may be performed using Equation $$U_{i+1} = \left\{ k \in U_i, k \neq \pi(i) \,\middle|\, \frac{|h_k h_{\pi(i)}^*|}{\|h_k\| \|h_{\pi(i)}^*\|} < \alpha \right\},$$

where h represents a channel vector of one user selected among the possible users, π(i) represents a user number selected as i-th, $U_{i+1}$ represents a set of the possible users at a step of selecting a i+1-th user, and α represents the predefined threshold.

After the step (d), after again performing steps (a) to (d) while adding 1 to i, when the number of selected users is M or no possible users remain, the selected user groups may be determined to be a final user group.

The method for selecting a user may further include: after the step (d), (e) after again performing again steps (a) to (d) while adding 1 to i, when the number of selected users is M or no possible users remain, storing the selected user groups; and when the number of selected users is M or no possible users remain, storing the selected user groups; and (f) changing a first selected user used as a user previously selected at the step (a) to repeat the steps (a) to (e) by a predetermined frequency N, wherein the channel orthogonality between the users belonging to each group is calculated for N selected user groups and the group having the largest channel orthogonality is determined to be the final user group.

According to an exemplary embodiment of the present invention, there is provided a method for selecting a user in a communication system including a base station having M antennas and K users having one receive antenna includes: (a) calculating channel orthogonality between each of the possible users and previously selected users; (b) selecting users having the largest channel orthogonality calculated at the step (a) among the possible users; (c) excluding the selected users from a set of the possible users; (d) excluding users having the channel orthogonality with the user selected at the step (b) smaller than a predefined threshold among the possible users; (e) after being fedback to the step (a) and performed up to the step (d), when the number of selected users is M or no possible users remain, storing the selected user groups; and (f) changing a first selected user used as a user previously selected at the step (a) to repeat the steps (a) to (e) by a predetermined frequency N, wherein the channel orthogonality between the users belonging to each group is calculated for N selected user groups and the group having the largest channel orthogonality is determined to be the final user group.

At the step (a), the channel orthogonality may be calculated using Equation $$\beta_k = \frac{\prod_{i=1}^{k} \|h_i\|^2}{\det[HH^*]}, H = [h_1^T | \ldots | h_{k-1}^T]^T.,$$

where i represents an order of algorithm performance, h is a channel vector of one user selected among the possible users, and H represents a channel matrix formed of channels of previously selected k−1 users.

The step (b) may be performed using Equation $$\pi(i) = \underset{k \in U_i}{\arg\min} \|\beta_k\|$$

$$S_c \leftarrow S_c \cup \{\pi(i)\},$$

where S represents selected user groups and π(i) represents a user number selected as i-th.

The step (d) may be performed using Equation $$U_{i+1} = \left\{ k \in U_i, k \neq \pi(i) \left| \frac{|h_k h_{\pi(i)}^*|}{\|h_k\| \|h_{\pi(i)}^*\|} < \alpha \right. \right\},$$

where i is an order of algorithm performance, h represents a channel vector of one user selected among the possible users, π(i) represents a user number selected as i-th, $U_{i+1}$ represents a set of the possible users at a step of selecting a i+1-th user, and α represents the predefined threshold.

The step (e) may be performed in a state in which 1 is added to i.

DESCRIPTION OF THE PREFERRED EMBODIMENTS

Figure 1:
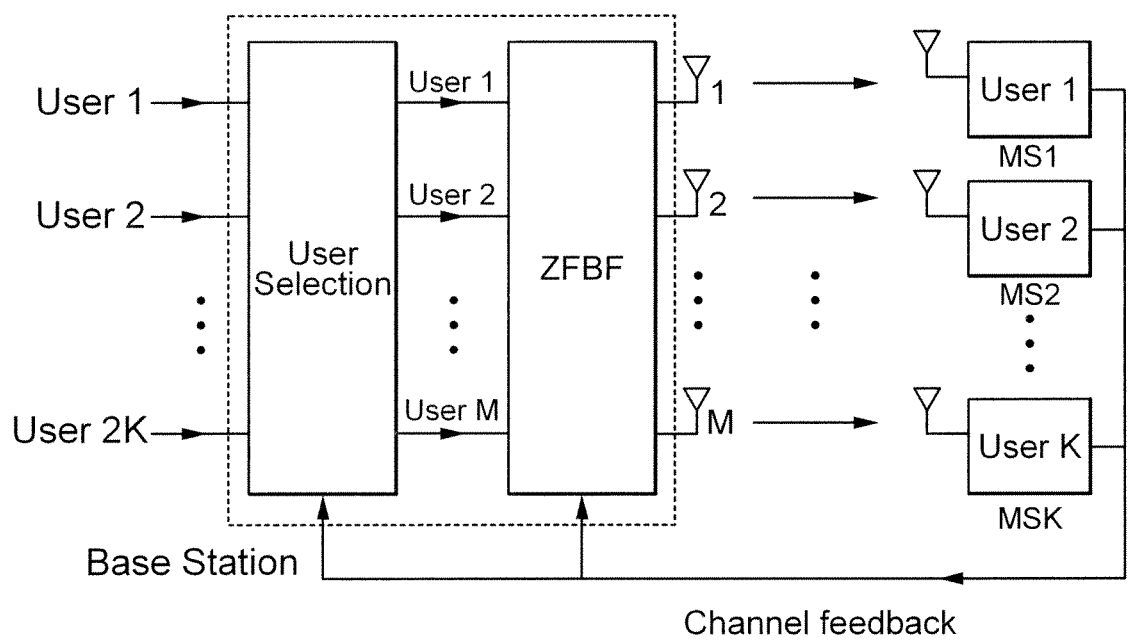
FIG. 1 is a diagram schematically showing a structure of a multiuser multiple input multiple output communication system.

Various advantages and features of the present invention and methods accomplishing thereof will become apparent from the following description of embodiments with reference to the accompanying drawings. However, the present invention may be modified in many different forms and it should not be limited to the embodiments set forth herein. These embodiments may be provided so that this disclosure will be thorough and complete, and will fully convey the scope of the invention to those skilled in the art. Like reference numerals throughout the description denote like elements.

Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Hereinafter, a configuration and an action of exemplary embodiments of the present invention will be described in more detail with reference to the accompanying drawings.

FIG. 1 is a diagram schematically showing a structure of a multiuser multiple input multiple output communication system.

Referring to FIG. 1, when a total of K users are present, a base station including M antennas smaller than K again receives each channel information from hour to hour and selects users that make throughput of the entire system maximize to transmit data to the user, thereby maximizing data traffic. That is, the multiuser diversity may be maximal.

However, in order to select a set of users that make the data traffic maximize, there is a need to consider all the possible sets of users. When the users are large, all the possible sets of users are exponentially increased, such that the complexity of calculation may be increased and it is difficult to implement the fast operation.

In order to solve the above-mentioned problem, as a method for selecting a user according to the exemplary embodiment of the present invention, a method for selecting a user using orthogonality has been proposed.

Figure 2:
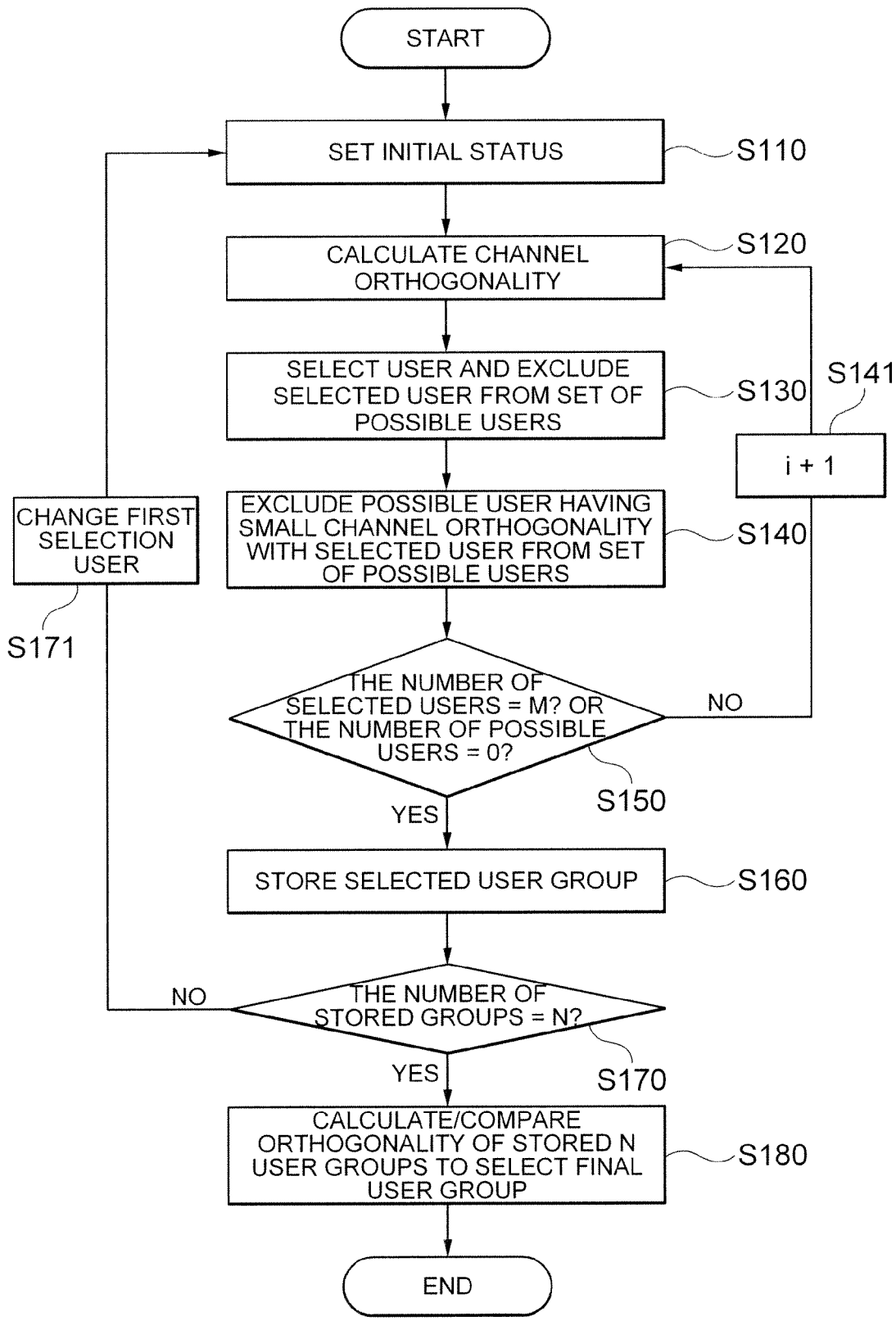
FIG. 2 is a flow chart showing a method for selecting a user according to an exemplary embodiment of the present invention.

FIG. 2 is a flow chart showing a method for selecting a user according to an exemplary embodiment of the present invention.

Referring to FIG. 2, the method for selecting a user according to the exemplary embodiment of the present invention may include a process of setting an initial status, calculating channel orthogonality, selecting users and/or excluding the selected users from a set of possible users, and reducing a set of possible users.

Hereinafter, the method for selecting a user according to the exemplary embodiment of the present invention will be described in detail with reference to FIG. 2 and Equations 1 to 4.

The setting of the initial status (S110) is a step of setting a start value for performing an algorithm.

For example, the initial state may be set by the following Equation 1.

$$U_i = \{1, \ldots, K\}$$

$$i=1, c=1$$

$$S_c = \Phi (\text{empty set}) \quad [\text{Equation 1}]$$

Where i=frequency of algorithm performance
U=possible user group
Ui=possible user group at the time of selecting i-th user, where i={1, 2, . . . , K}
S: selected user group
Sc: c-th selected user group Next, at the calculating of the channel orthogonality, the channel orthogonality between the possible users and the previously selected users is calculated. The calculating of the channel orthogonality is each performed on all the possible users (S120). In this case, the selected user may mean users belonging to the user group selected at the previous step. When the algorithm is first performed, the selected users may not be present. In this case, the subsequent processes may be performed by setting any one user as the selected user in the possible user group.

In this case, the process of calculating the channel orthogonality may be performed by using the following Equation 2.

$$\beta_k = \frac{\prod_{i=1}^{k} \|h_i\|^2}{\det[HH^*]}, H = [h_1^T \ldots h_{k-1}^T]^T.$$ [Equation 2]

Where h: channel vector of user

H: channel matrix formed of channels of k−1 users selected in advance $\beta_k$ may be derived using Equation 2, wherein the $\beta_k$ is a parameter value representing how large the orthogonality between the user k and the previously selected users is. It can be appreciated that the smaller the $\beta_k$ value, the large the channel orthogonality becomes.

Next, the selecting of the user and/or the excluding of the selected user from the set of possible users compares the channel orthogonality calculated at the previous step to select the user having the largest channel orthogonality (S130). In this case, various operation processes to be described below may be simplified by excluding the selected users from the set of possible users.

In this case, when π(i) is defined by a user number selected as i-th, the user can be selected using the following Equation 3.

$$\pi(i) = \underset{k \in U_i}{\arg\min} \|\beta_k\|$$ [Equation 3]

$$S_c \leftarrow S_c \cup \{\pi(i)\}$$

Next, the reducing of the set of possible users (S140), the users selected at an immediately before step and the users having the orthogonality smaller than a predetermined reference may be excluded from the possible user group by calculating and comparing the channel orthogonality among respective users belonging to the set of possible users.

In addition, the present process may use the following Equation 4.

$$U_{i+1} = \left\{ k \in U_i, k \neq \pi(i) \left| \frac{|h_k h_{\pi(i)}^*|}{\|h_k\| \|h_{\pi(i)}^*\|} < \alpha \right. \right\}$$ [Equation 4]

α: predefined threshold

In this case, in the above Equation, α is a predefined threshold. When α is a relatively small, a relatively large number of users are excluded, which leads to the increase in an operation speed. On the other hand, when α is a relatively large, the operation speed is long, but a possibility of selecting a user having the multiuser diversity may be improved. Therefore, the reference may be set in consideration of the required operation speed and accuracy, and the like.

Meanwhile, after the process of reducing the possible user group is completed, the calculating of the channel orthogonality (S120), the selecting of users and/or the excluding of the selected users from a set of possible users (S130), and the reducing of the set of possible users (S140) are performed again. The aforementioned processes are repeated until the predetermined conditions are satisfied to generate the selected user group.

In this case, the predetermined conditions may be the case in which the number of selected users is equal to M that is the number of antenna of the base station or no possible users for selecting users remains.

It is determined whether to satisfy the predetermined conditions. If so, the process proceeds to a subsequent step and if not, the process adds 1 to i and feedbacks (S150) it to the calculating of the channel orthogonality (S120).

As described above, when the selected user groups are generated, the data transmission efficiency may be improved by performing the transmission and reception on the corresponding user group.

In this case, the selected user groups can be stored in some storage means such as a memory (S160).

Meanwhile, when the calculating of the channel orthogonality (S120) is first performed, any one user is selected and used from the possible user group.

However, the most optimized user may not be selected by a fact that the user is optionally selected.

The aforementioned processes are performed while changing the selected users (S171) when the calculation of the orthogonality is first performed in consideration of the fact to derive the selected user groups.

Meanwhile, even in deriving the plurality of selected user groups, as the selected user groups are large, the user group capable of maximizing the multiuser diversity may be advantageously derived, but the time consumed to select the users may be increased accordingly. Therefore, it is preferable to determine the user group at an appropriate frequency.

Therefore, as shown in FIG. 2, when the number of stored groups by processing the step S160 is N, the deriving of the selected user groups ends (S170). The group having the largest channel orthogonality is selected from the selected user groups stored till then and may be determined as a final user group (S180). In this case, the N may be a value that may be set in consideration of the operation speed and accuracy.

As set forth above, the exemplary embodiments of the present invention can select several user groups as a candidate and finally select the groups having the most excellent orthogonality among the possible user groups, thereby selecting the user groups with more improved orthogonality than the user groups selected according to the related art and increasing the multiuser diversity accordingly.

Further, the exemplary embodiment of the present invention can perform the process of selecting a user by using Equations having the lower complexity than Equations used in the related art, thereby reducing the burden of the processor performing the process of selecting a user group.

The present invention has been described in connection with what is presently considered to be practical exemplary embodiments. Although the exemplary embodiments of the present invention have been described, the present invention may be also used in various other combinations, modifications and environments. In other words, the present invention may be changed or modified within the range of concept of the invention disclosed in the specification, the range equivalent to the disclosure and/or the range of the technology or knowledge in the field to which the present invention pertains. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. A method for selecting a user in a communication system including a base station having M antennas and K users having one receive antenna, comprising:
    (a) calculating channel orthogonality between each possible user and previously selected users; and
    (b) selecting user having a largest channel orthogonality calculated;
    wherein said calculation uses an equation:

$$\beta_k = \frac{\prod_{i=1}^{k} \|h_i\|^2}{\det[HH^*]}, H = [h_1^T | \ldots | h_{k-1}^T]^T,$$

and
    said selecting uses an equation:

$$\pi(i) = \underset{k \in U_i}{\arg\min} \|\beta_k\|$$

$$S_c \leftarrow S_c \cup \{\pi(i)\},$$

where i represents an order of algorithm performance,
    h is a channel vector of one user selected among the possible users,
    H represents a channel matrix formed of channels of previously selected k−1 users,
    S represents selected user groups, and
    π(i) represents a user number selected as i-th.

2. The method of claim 1, further comprising: after calculating and selecting, excluding one of said selected users from the set of the possible users.

3. The method of claim 2, further comprising: after the excluding, further excluding users having a channel orthogonality with the user selected at the selecting smaller than a predefined threshold among the possible users.

4. The method of claim 3, wherein the further excluding is performed using an equation:

$$U_{i+1} = \left\{ k \in U_i, k \neq \pi(i) \middle| \frac{|h_k h_{\pi(i)}^*|}{\|h_k\| \|h_{\pi(i)}^*\|} < \alpha \right\},$$

where h represents a channel vector of one user selected among the possible users,
    π(i) represents a user number selected as i-th,
    $U_{i+1}$ represents a set of the possible users at a step of selecting a i+1-th user, and
    α represents the predefined threshold.

5. The method of claim 4, wherein after the further excluding, after again performing the calculating, selecting, excluding and further excluding while adding 1 to i, when a number of selected users is M or no possible users remain, a selected user group is determined to be a final user group.

6. The method of claim 4, further comprising:
    after the further excluding,
    (e) after again performing the calculating, selecting, excluding and further excluding while adding 1 to i, when the number of selected users is M or no possible users remain, storing the selected user groups; and
    (f) changing a first selected user used as a user previously selected at the calculating to repeat the calculating, selecting, excluding, further excluding, and step (e) by a predetermined frequency N,
    wherein the channel orthogonality between the users belonging to each group is calculated for N selected user groups and the group having the largest channel orthogonality is determined to be the final user group.

7. A method for selecting a user in a communication system including a base station having M antennas and K users having a receive antenna, comprising:
    (a) calculating channel orthogonality between each of possible users and previously selected users;
    (b) selecting a user having a largest channel orthogonality calculated at the step (a) among the possible users;
    (c) excluding a user selected at the step (b) from a set of the possible users;
    (d) excluding users having a channel orthogonality with the user selected at the step (b) smaller than a predefined threshold among the possible users;
    (e) after being feedback to the step (a) and performed up to the step (d), when a number of selected users is M or no possible users remain, storing a selected user group; and
    (f) changing a first selected user used as a user previously selected at the step (a) to repeat the steps (a) to (e) by a predetermined frequency N,
    wherein the channel orthogonality between the users belonging to each group is calculated for N selected user groups and the group having the largest channel orthogonality is determined to be the final user group.

8. The method of claim 7, wherein at the step (a), the channel orthogonality is calculated using an equation:

$$\beta_k = \frac{\prod_{i=1}^{k} \|h_i\|^2}{\det[HH^*]}, H = [h_1^T | \ldots | h_{k-1}^T]^T,$$

where i represents an order of algorithm performance,
    h is a channel vector of one user selected among the possible users,
    H represents a channel matrix formed of channels of previously selected k−1 users.

9. The method of claim 8, wherein the step (b) is performed using an equation:

$$\pi(i) = \underset{k \in U_i}{\arg\min} \|\beta_k\|$$

$$S_c \leftarrow S_c \cup \{\pi(i)\},$$

where S represents selected user groups and π(i) represents a user number selected as i-th.

10. The method of claim 7, wherein the step (d) is performed using an equation:

$$U_{i+1} = \left\{ k \in U_i, k \neq \pi(i) \middle| \frac{|h_k h_{\pi(i)}^*|}{\|h_k\| \|h_{\pi(i)}^*\|} < \alpha \right\},$$

where i is an order of algorithm performance, h represents a channel vector of one user selected among the possible users, π(i) represents a user number selected as i-th, $U_{i+1}$ represents a set of the possible users at a step of selecting a i+1-th user, and α represents the predefined threshold.

11. The method of claim 10, wherein the step (e) is performed in a state in which 1 is added to i.

* * * * *